United States Patent [19]

Davis

[11] Patent Number: 5,706,048
[45] Date of Patent: Jan. 6, 1998

[54] WIRELESS DIGITAL DATA ACCESS SYSTEM AND METHOD

[75] Inventor: Mark Bruce Davis, Mesa, Ariz.

[73] Assignee: Motorola, Inc., Schaumburg, Ill.

[21] Appl. No.: 427,325

[22] Filed: Apr. 24, 1995

[51] Int. Cl.$^6$ ................................................ H04N 7/173
[52] U.S. Cl. ............................ 348/12; 348/13; 455/5.1
[58] Field of Search .................................. 348/12, 7, 13, 348/6; 455/4.2, 4.1, 5.1, 6.1, 6.3; 370/76, 73, 124, 110.1, 50, 70; H04N 7/173, 7/16

[56] References Cited

U.S. PATENT DOCUMENTS

| | | | |
|---|---|---|---|
| 4,747,160 | 5/1988 | Bossard | 455/33 |
| 5,247,347 | 9/1993 | Litteral et al. | 455/4.2 |
| 5,425,027 | 6/1995 | Baran | 370/69.1 |
| 5,481,542 | 1/1996 | Logston et al. | 370/94.2 |
| 5,481,757 | 1/1996 | Mihara et al. | 348/12 |
| 5,528,582 | 6/1996 | Bodeep et al. | 348/12 |
| 5,553,064 | 9/1996 | Paff et al. | 370/50 |
| 5,555,015 | 9/1996 | Aguayo, Jr. et al. | 348/12 |

Primary Examiner—John K. Peng
Assistant Examiner—Chris Grant
Attorney, Agent, or Firm—Gregory J. Gorrie

[57] ABSTRACT

A communication system includes a high data capacity microwave link in the millimeter band. A defined frequency band is segmented allowing for direct video transmission in a first segment while at the same time achieving full duplex operation within a second segment. The system provides a wide variety of data and video services including two-way video communication and data transfer, direct broadcast video, video teleconferencing, video library access and telephony. A subscriber transmits a request for custom video, a real-time two-way data link, or a non-real time asymmetrical data download. The hub allocates the appropriate bandwidth necessary for the service and assigns a carrier frequency and time-slot to the subscriber. The hub retrieves the appropriate video or data and transmits it to the subscriber, or establishes a data link between the subscriber and a data network.

20 Claims, 9 Drawing Sheets

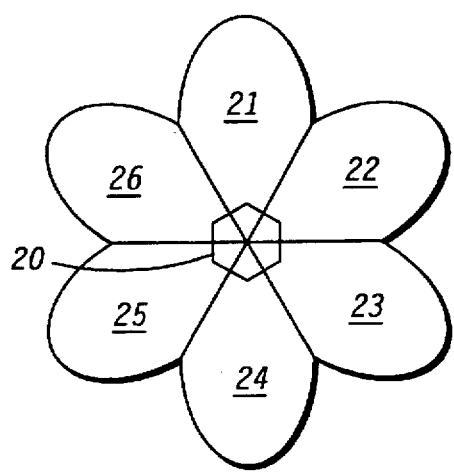
FIG. 2
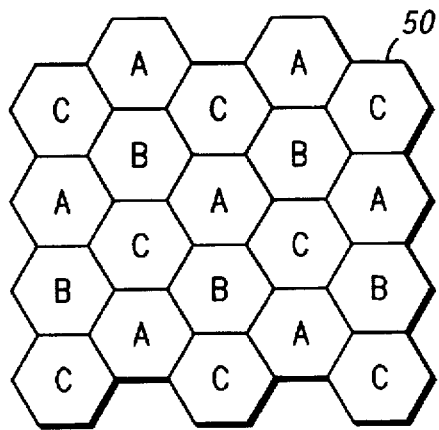
FIG. 4
FIG. 3
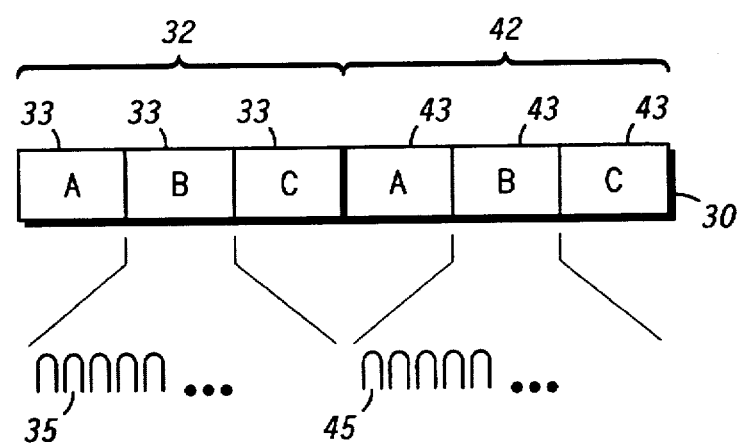

WIRELESS DIGITAL DATA ACCESS SYSTEM AND METHOD

FIELD OF THE INVENTION

This invention relates in general to the field of communication systems, in particular to digital wireless communication systems and more particularly to video transmission systems and wireless local area networks (LANs).

BACKGROUND OF THE INVENTION

Access to information systems and high speed data networks such as the National Information Infrastructure through wideband data channels can provide consumers with many types of information and services that are not presently possible. For example, such services may include on demand video programming, two-way video communication, and improved access to data networks such as the internet.

Presently, consumers generally have limited access to data networks and information systems (i.e., the information superhighway) from their homes. Access to the information superhighway for consumers is generally through cable television system lines or telephone system lines. Neither of these systems are adequately suited for broad-band data transfer or high-speed data transfer or broad-band two-way communications. For example, cable television distribution systems are generally unidirectional and distribute analog signals from a cable system headend to individual residences. To support two-way communications and interaction by consumers, existing cable television system equipment would require significant modification. Telephone system lines, for example, generally do not have the bandwidth capability or data-rate capability to support high-speed or broad band data transfer. One solution proposed by the telephone companies is providing fiber optic cable between residences and data networks, however this requires a significant investment.

As a result, consumers generally cannot take advantage of data networks and information systems because of the link between their home and a high speed data network and services such as digital video programming, digital network access, video teleconferencing and video telephony, video libraries and on demand video are not available to consumers.

Thus what is needed is a communication system that provides high data rates between locations without coax or fiber optical cables. Thus what is needed are a method and apparatus that provide an alternative link to broadband information systems. What is also needed are a method and apparatus that provides access to broadband information systems that is low cost. What is also needed are a method and apparatus that support high speed data transfer. What is also needed are a method and apparatus that provides real-time two-way broadband communication. What is also needed are a method and apparatus that allows for on demand video without wireline or optical links.

BRIEF DESCRIPTION OF THE DRAWINGS

The invention is pointed out with particularity in the appended claims. However, a more complete understanding of the present invention may be derived by referring to the detailed description and claims when considered in connection with the figures, wherein like reference numbers refer to similar items throughout the figures.

FIG. 2 is a simplified diagram antenna patterns provide by a communication hub suitable for use in a preferred embodiment of the present invention.

FIG. 3 is an illustration of segmentation of the frequency band suitable for use in a preferred embodiment of the present invention.

FIG. 4 is an illustration of a spatial and frequency reuse pattern suitable for use in a preferred embodiment of the present invention.

The exemplification set out herein illustrates a preferred embodiment of the invention in one form thereof, and such exemplification is not intended to be construed as limiting in any manner.

DETAILED DESCRIPTION OF THE DRAWINGS

The present invention provides, among other things, a method and apparatus for connecting users with high speed data networks. The present invention also provides, among other things, a wide-band data communication link that allows for two-way video, interactive video, and wide band data transfer while at the same time allowing for high-speed data transfer from various data networks. The communication system includes a high data capacity microwave link in the millimeter band. A defined frequency band is segmented allowing for direct video transmission in a first segment while at the same time achieving full duplex operation within a second segment. The system provides for a wide variety of data and video services including two-way video communication and data transfer, direct broadcast video, video teleconferencing, video library access and telephony. A subscriber transmits a request for a custom video or data service to a communication hub. The hub determines whether the request is for custom video, a real-time two-way data link, or a non-real time asymmetrical data download. The hub allocates the appropriate bandwidth necessary for the service and assigns a carrier frequency and time-slot to the subscriber. The hub retrieves the appropriate video or data and transmits it to the subscriber, or establishes a data link between the subscriber and a data network.

Figure 1:
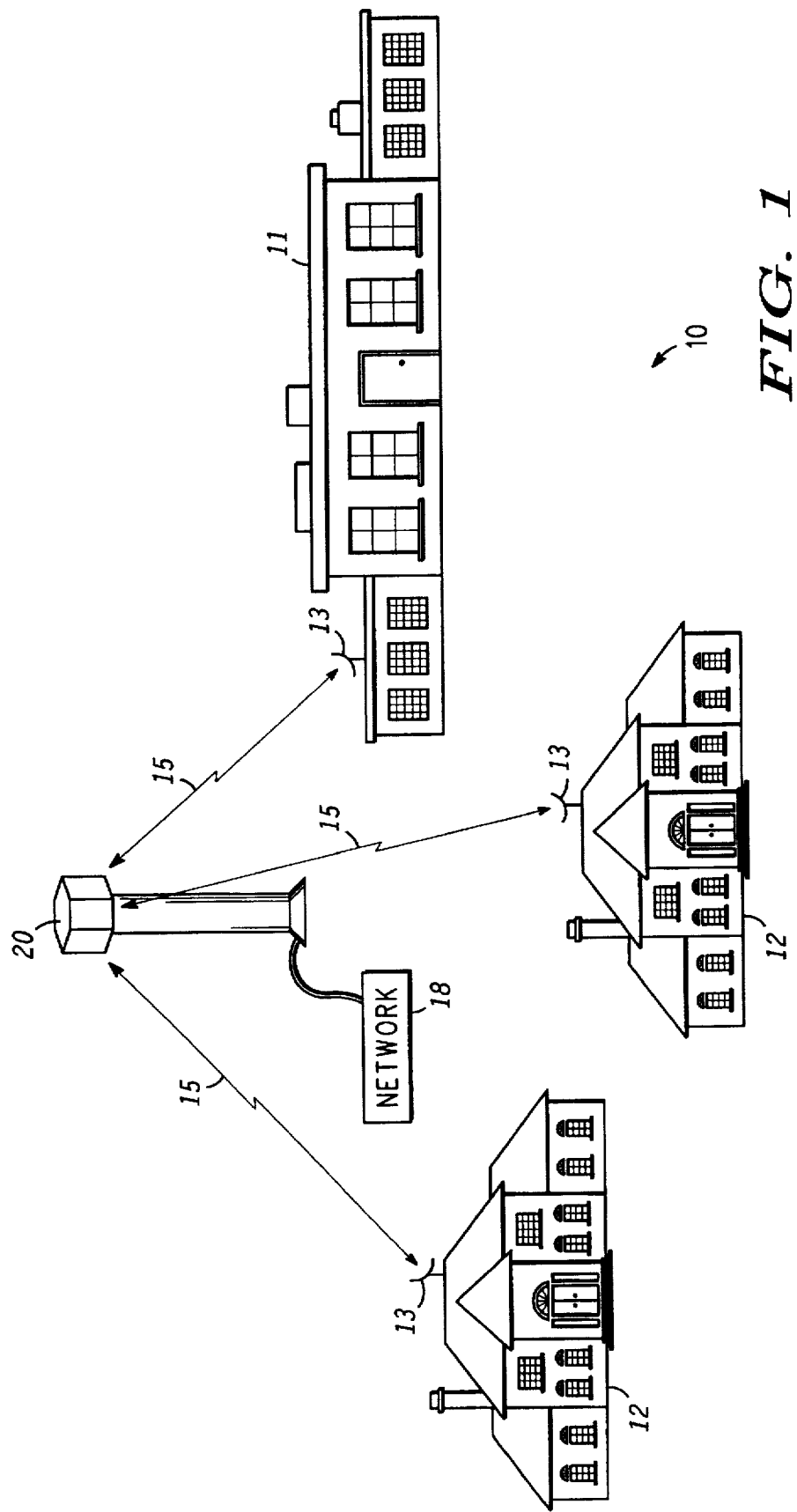
FIG. 1 is a simplified diagram of a wideband communication system in which the present invention may be practiced.

FIG. 1 is a simplified diagram of wideband communication system 10 in which the present invention may be practiced. Communication hub 20 provides RF links 15 to private homes 12 and small businesses 11. Communication hub 20 is coupled to network 18. Network 18 preferably includes high speed data networks, access to the internet, video libraries and on-line data services. Private homes 12 and small businesses 11 connect to RF links 15 through microwave antennas 13. In the preferred embodiment, RF links 15 have a frequency range between 28.0 and 30.5 GHz.

FIG. 2 is a simplified illustration of antenna patterns provided by communication hub suitable 20 for use in a preferred embodiment of the present invention. Communication hub 20 provides six antenna patterns or sectors 21–26 which are segmented in azimuth. Although six antenna patterns or beams are shown, nothing requires this and more or less may be used. In one embodiment, each antenna transmits substantially identical signals. In another embodiment, frequencies and time-slots are reused in non-adjacent antenna patterns.

FIG. 3 is an illustration of segmentation of a frequency band suitable for use in a preferred embodiment of the present invention. Frequency band 30 is preferably used for the transmission of data on microwave links 15 (FIG. 1). Frequency band 30 is segmented into data band 32 (data segment) and video broadcast band 42 (video segment). Both data band 32 and video broadcast band 42 are further segmented into several subbands. For example, data band 32 is shown as having three data subbands 33 designated by the letters "A", "B" and "C". Likewise, video broadcastband 42 is segmented into three video subbands designated by the letters "A", "B" and "C". The designators "A", "B" and "C" refer to frequency reuse patterns discussed below in FIG. 4. Although data band 32 and video broadcast band 42 are shown with three subbands each, nothing requires this. More or less subbands may be used.

Data subbands 33 are used for transmission and reception of data between subscriber terminals and a communication hub, while video subbands 43 are preferably used for the transmission of video data from a hub. In a preferred embodiment of the present invention, frequency band 30 has a bandwidth of approximately 2 GHz and the frequency ranges from 28.0 GHz to 30.5 GHz. However, the bandwidth of frequency band 30 may range from several hundred MHz up to several GHz. For example, when the bandwidth is 2 GHz, the data band has a bandwidth of approximately 1 GHz and the video band has a bandwidth of approximately 1 GHz. However there is no requirement that data band 32 and video broadcast band 42 have the same bandwidth. In the example shown in FIG. 3, data subbands 33 and video subbands 43 have a bandwidth of approximately 333 MHz.

In a preferred embodiment of the present invention, each data subband 33 is comprised of many data carrier frequencies 35. Preferably, each carrier frequency 35 is around 1.5 MHz resulting in approximately 200 carrier frequencies 35 per data subband. Data carrier subbands 33 are also preferably time division multiplexed and include both transmit and receive time-slots. The time-slots are preferably around 30 ms in length. Subscriber terminals are assigned a data carrier frequency 35 and a transmit and receive time-slot to communicate with hub 20. Preferably, the receive and transmit time-slots are segmented so that they may be shared by many subscriber terminals.

Video subband 43 is comprised of many video carrier frequencies 45. Preferably, each video carrier frequency 45 is around 1.5 MHz resulting in approximately 200 video carriers frequencies for each video subband 43. Some video carrier frequencies 45 may be dedicated for certain video transmissions such as network television, HBO, etc. Other video carriers may be used for specific transmissions of video to a subscriber terminal or a groups of subscriber terminals. In the preferred embodiment, subscriber terminals transmit requests for video or data services over one of data subbands 33. This is discussed in more detail below.

FIG. 4 is an illustration of a spatial and frequency reuse pattern suitable for use in a preferred embodiment of the present invention. Each cell 50 is defined by a centrally located communication hub 20 within each cell. Each cell shown in FIG. 4 is designated with a letter, either "A", "B", or "C", which indicates the particular data subband 33 and video subband 43 that are used within the cell. For example, cells designated with the letter "A" correspond to data subband 33 and video subband 43 that are designated with the letter "A" while cells designated with the letter "B" correspond to data subband 33 and video subband 43 that are designated with the letter "B", and cells designated with the letter "C" correspond to data subband 33 and video subband 43 that are designated with the letter "C". In this way, a frequency reuse scheme is realized. Although only a three cell frequency reuse pattern is shown in FIG. 4, more or less than three can be used. For example, a seven cell frequency reuse pattern may also be used.

In another embodiment of the present invention, frequency reuse is accomplished within individual cells. In this embodiment, video carrier subbands 43 and/or data carrier subbands 33 (FIG. 3) used in sectors 21 (FIG. 2) may be reused is sector 23, 24 or 25, for example. This way, many more users can receive different data information a single hub.

Figure 5:
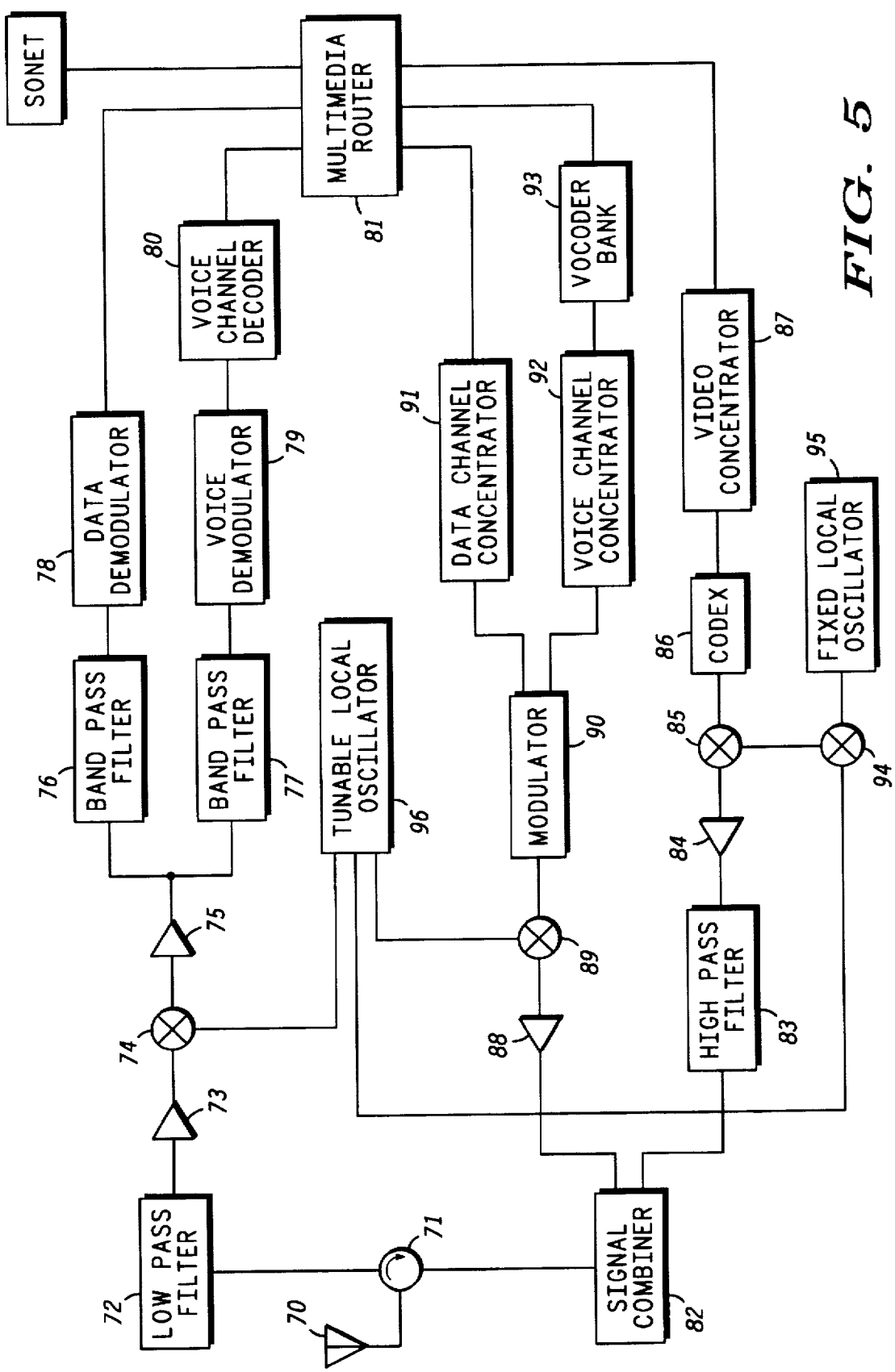
FIG. 5 is a simplified block diagram of a wideband communication hub suitable for use in a preferred embodiment of the present invention.

FIG. 5 is a simplified block diagram of a wideband communication hub suitable for use in a preferred embodiment of the present invention. The components shown in FIG. 5 are preferably used for generating one or more of antenna patterns of communication hub 20 (FIG. 4).

Hub 20 includes antenna 70 coupled to circulator 71 which is coupled to low-pass filter 72 (LPF) and low noise amplifier 73 (LNA). LPF 72 preferably passes signals of data subband 33 while rejecting signals of video subbands 43. LNA 73 is coupled to video and data down converter 74 which down converts the data subband to an intermediate frequency (IF) band. Video and data down converter 74 is coupled to IF amplifier 75 that provides additional amplification of data subbands to correct for the losses in video and data down converter 74. IF amplifier 75 is coupled to two band pass filters. Data subband filter 76 passes frequencies that are used for the transmission of two-way data communication channels. Bandpass filter 77 preferably passes a frequency band within the data subband utilized to carry two-way voice communication. Bandpass filter 77 is coupled to voice demodulator 79 which detects and demodulates the two-way voice data. Voice demodulator 79 is coupled to voice channel decoder 80 that decodes the digitized voice channels to the desired format whether it is analog or some other digital format. The output of data subband bandpass filter 76 is coupled to demodulator 78 that detects digital signals that are modulated upon the carrier. Demodulator 78 is coupled to a multimedia router 81 that provides the switching of the data channels to their correct destinations. Voice channel decoder 80 is coupled to the multimedia router 81.

The output of the multimedia router 81 is coupled to the input to a video output port, a data output port and a phone or voice port. The video program port is connected to video concentrator 87 or multiplexer which mixes the video signals, both analog and digital as appropriate. Video concentrator 87 is coupled to video block upconverter 85 which translates video channels to an appropriate carrier frequency for transmission to subscriber terminals. Video block upconverter 85 is coupled to high power amplifier 84 (HPA) which boost the signals to provide sufficient transmit power to provide good signal reception at the subscriber units. The output of HPA 84 is coupled to high pass filter 83 (HPF) which passes frequencies in the video subband and rejects signals in the data subband to reduce potential hub self interference into the hubs own data subband. HPF 83 is coupled to signal combiner 82 which combines the data and video subband.

Multimedia router 81 data output port is coupled to a data channel concentrator or multiplexer 91 which combines the data channel signals. Multimedia router 81 is also coupled to voice encoder 93 that encodes telephone voice channels to the correct format. Voice encoder 93 is connected to a channel multiplexer or channel concentrator 92 which combines the individual voice channels. The voice channel concentrator 92 is coupled to a multichannel digital modulator 90 which modulates the digital signal onto and IF carrier. Multichannel digital modulator 90 is coupled to voice and data upconverter 89 that upconverts the data and voice subbands to the transmit output frequency voice and data upconverter 89 couples to high power amplifier 88 (HPA) that amplifies the input signal level to power level sufficient to provide the desired link quality. HPA 88 is coupled to signal combiner 82 which combines the video, data and voice subband.

Fixed local oscillator 95 provides the frequency offset to provide the proper frequency offset between the data subband used and the video subband used. Tunable local oscillator 96 is used to tune to the correct frequency of set to provide all of the frequency upconversion and down conversion. Tunable local oscillator 96 is coupled to video and data down converter 74 in the data subband 33, and to voice and data upconverter 85. Tunable local oscillator 96 is also coupled to frequency converter 94 that mixes fixed local oscillator 95 and the tunable oscillator 96 to produce a frequency offset. The correct frequency offset is provided to video block upconverter 85 for video transmission.

Figure 6:
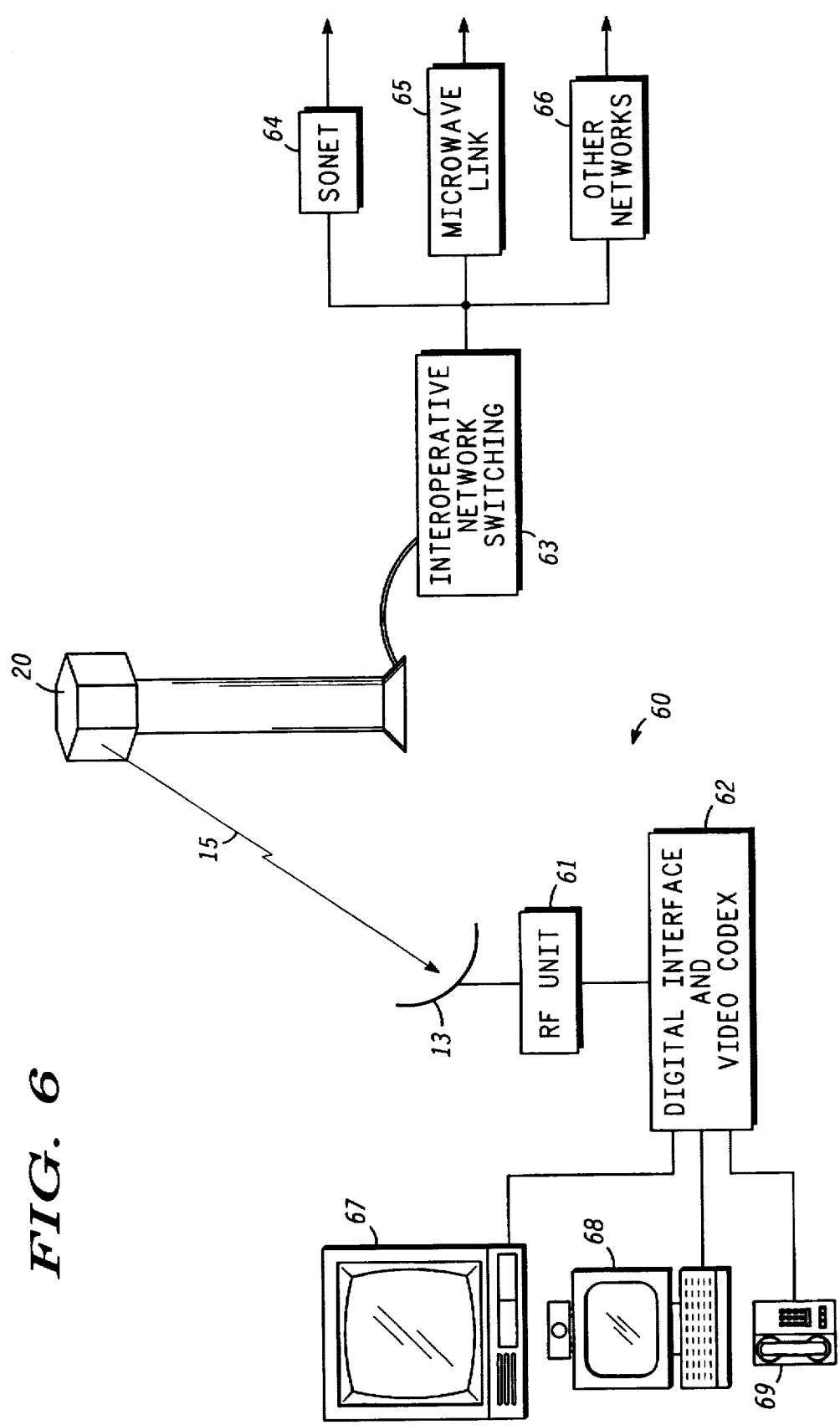
FIG. 6 is an illustration of services available through a communication hub suitable for use in a preferred embodiment of present invention.

FIG. 6 is an illustration of services available through a communication hub suitable for use in a preferred embodiment of the present invention. In the preferred embodiment, digital interface and video codex 62 includes a network interface module coupled to antenna 13. Preferably, digital interface and video codex 62 include a subscriber router control unit coupling the network interface module to a local peripheral network which couples with provides video 67, computer 68 and telephone 69 services. Preferably, digital interface and video codex 62 also includes a user interface coupled with the subscriber router control unit. In one embodiment, standards of the Video Electronics Standards Association (VESA) are used. VESA is developing the standards for an open bus architecture for what is being called the "VESA Open Set Top" (VOST) box that provides a standard internal bus definition that is used to interface with various electronics with in the home.

Communication hub 20 couples through link 15 to antenna 13. Preferably, hub 20 linked to interactive network switch 63 couples the hub to other high-speed network resources. The connections with other networks permit the hub to complete two-way communication from the hub to other networks or existing communication infrastructure. These include fiber optic network data transmission systems such as a Synchronous Optical Networks (SONET), data transport capabilities, or wireline communications such as an Integrated Digital Subscriber Network (ISDN). The connections may be made directly or by millimeter wave links back to the central hub which provide additional high-speed network interfaces.

Figure 7:
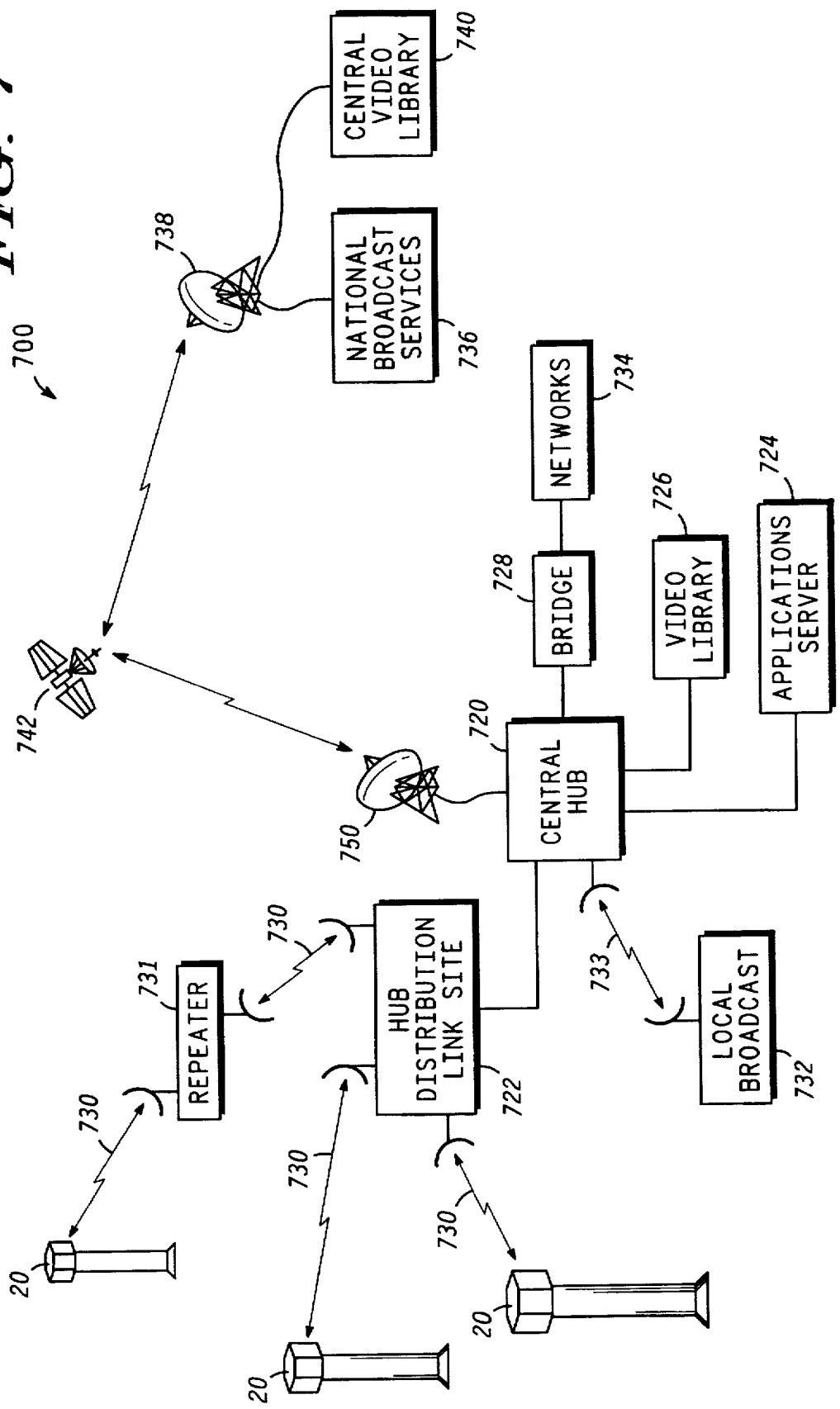
FIG. 7 is a simplified functional block diagram of communication hubs coupled through a central communication hub suitable for use in a preferred embodiment of the present invention.

FIG. 7 is a simplified functional block diagram of communication hubs coupled through a central communication hub suitable for use in a preferred embodiment of the present invention. Central hub 720 couples with several of hubs 20 through wireless links 730 and hub distribution link site 722. In one embodiment of the present invention, some of hubs 20 are connected through repeater 731. Central hub 720 receives local television broadcast 732 through link 733. Link 733 is preferably either an RF link, a coax link or an optical link suitable for the transmission of television broadcasts. Central hub 720 also couples with applications server 724 which includes processors for providing video games, on line data, electronic news and home shopping services. Applications server 724 is preferably located near central hub 720, but may be located remotely and coupled with central hub 720 with a high data rate link.

Central hub 720 may also be coupled to several of video libraries 726. Preferably, video material is stored in video libraries in several forms including RAM, disk or magnetic tape. The video programming is stored and accessed by a video server which manages the storage and retrieval of video programs. The video programs may be stored in analog format such as VHS tape, or the video programming may be digitized and stored on a variety digital media including magnetic tape drives, magnetic disk drives and optical disc drives. In one embodiment, video information that requires high speed access is stored directly into Random Access Memory (RAM) for rapid retrieval. RAM memory serves to buffer the retrieval from other storage media and assists in providing smooth data flow.

Central hub is also coupled to Metropolitan Area Networks (MAN) and Local Area Networks (LAN) 734 through bridge 728. Bridge 728 links central hub 720 to other LANs and/or MANs by translating protocols. Formatting and timing with other networks is performed when required.

Central hub 720 is coupled to satellites 742 through earth terminal 750. Preferably, earth terminal 750 communicates with geosynchronous satellites that provide access to services and data including video programming and video libraries. For example, satellite 742 may be linked to ground station 738 which provides national broadcast services 736 and access to a central video library 740. The national broadcast service 736 provides syndicated national network television programming and the central video library serves as a regional or national storage center of video programming. The video programming is stored in either analog or digital format for access and distribution to individual remote sites.

Figure 8:
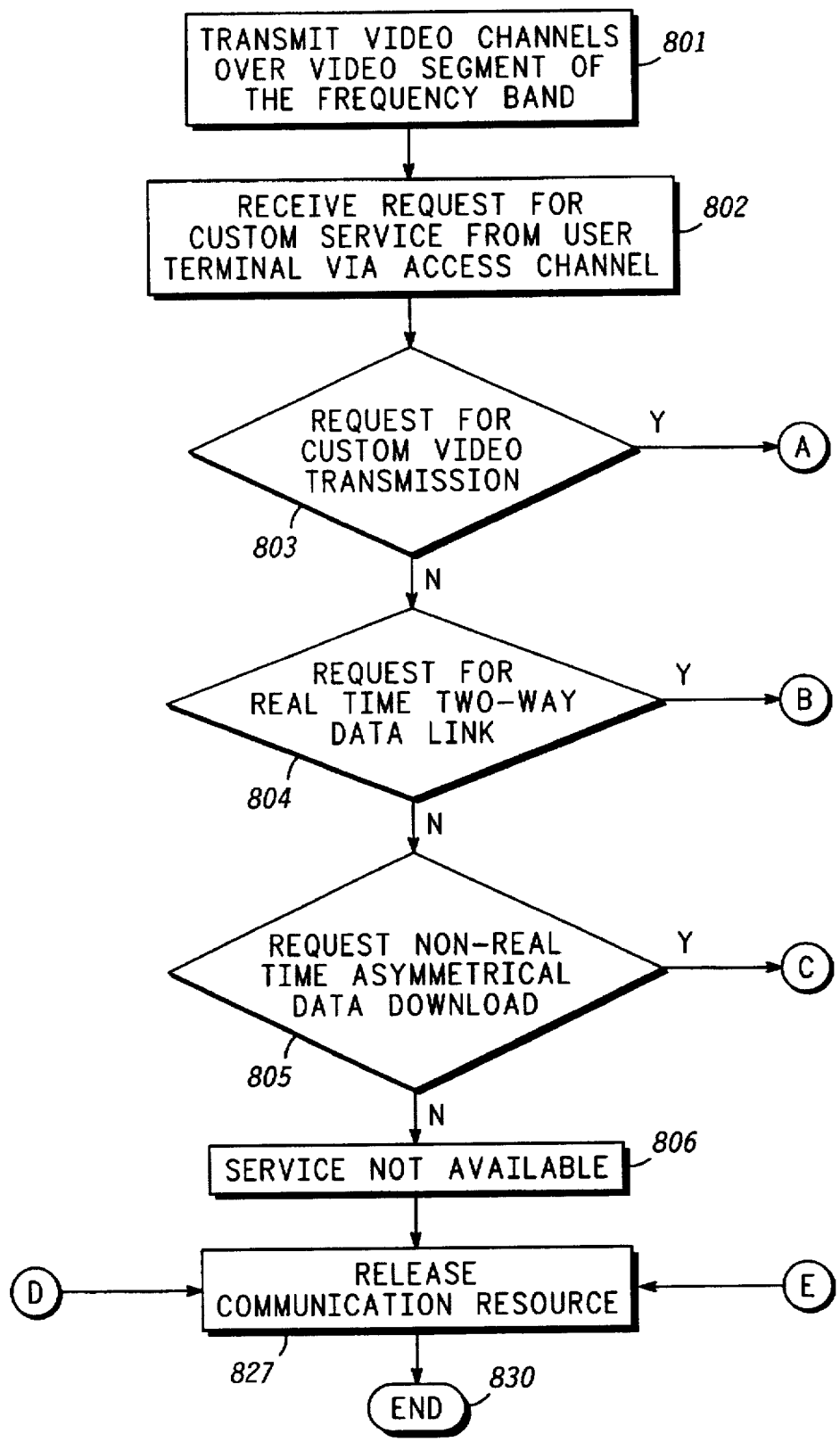
FIG. 8 illustrates a flow chart of a portion of a procedure performed by a communication hub when a request for a custom video or data service is received suitable for use in a preferred embodiment of the present invention.

FIG. 8 illustrates a flow chart of a portion of procedure 800 performed by a communication hub when a request for a custom video or data service is received suitable for use in a preferred embodiment of the present invention. Portions of procedure 800 are performed whenever a subscriber terminal requests a custom video or data service from a communication hub, such as hub 20 (FIG. 1).

In task 801, a communication hub provides transmission of a standard offering of video programming on an assigned carrier frequency within a video segment of the frequency band. Preferably, the transmission of video programming is on a substantially continuous basis. The standard offering of video programming may also include premium video channels which are preferably scrambled to prevent unauthorized viewing. The standard offering of video programming transmissions desirably includes video broadcasts of menus that may include video library lists, data library lists, lists of available video channels, available network data services, etc.

In task 802, the communication hub receives a request from a subscriber terminal for a custom service. The request is preferably received on a carrier frequency designated as an access channel. The access channel may be a designated frequency band within a two-way data communications band that has been designated to accommodate all access request from subscriber terminals within a coverage are. For example, one or more of data carrier frequencies 35 of data subband 33 (FIG. 3) may be dedicated for subscriber terminal access requests. Separate access channels are preferably designated for each frequency reuse band, shown as data subbands designated by letters "A", "B", and "C" in FIG. 3. The request for access includes the specific type of service requested and may include additional details that the hub may need to process the request. For example, the subscriber terminal may specify a desired data bandwidth and link parameters that may be necessary for the type of service requested. Additional information for the link parameter includes factors such as an acceptable bit error rate, data latency or continuity requirement, data rate and peak to average data rate, for example.

In task 803, the communication hub determines when the request for custom service is for a custom video transmission such as a video-on-demand or a near-video-on-demand program. The subscriber terminal may request a preview of a video or request a video without a preview. The request is processed by the hub. The hub responds by either providing a preview or proceeding to broadcast the subscriber selected video feature per the direction of the subscriber.

When the requested service is not for custom video transmission, task 804 is executed. In task 804, the communication hub determines when the custom service requested is for establishment of a real time two-way data link to the subscriber terminal. Real time two-way data links, for example, can serve a wide range of general functions including access to data and communication networks, access to on-line data bases, interactive video including video games, two-way video conferencing, standard telephony, etc. A real time two-way data link established by the communication hub is preferably a general purpose real time two-way data link that supports a wide range of data communication services. When task 804 determines that the service requested is for a real-time data link, task 808 (FIG. 10) is executed.

When the requested service is not for a real-time two-way data link, task 805 is executed. In task 805, the communication hub determines when the custom service requested is for a non-real time asymmetrical two-way data link. A non-real time asymmetrical two-way data link is used primarily for down loading data or information from the communication hub to the subscriber terminal. In the preferred embodiment, the primary direction of data flow is from the hub to the subscriber terminal with limited data transmission from the subscriber terminal to the hub, but nothing requires this. A non-real time asymmetrical two-way data link is preferably used to down load data that does not have a real time requirement. For example, a non-real time asymmetrical two-way data link may be used for updates to menu selections and options that reside in the subscriber terminal, downloading publications such as newspapers and magazines transmitted in electronic form, and downloading data from databases. In one embodiment of the present invention, non-real time asymmetrical two-way data link transmissions are scheduled for off peak hours so that valuable communication resources are not consumed during peak demand periods. When the service requested is a non-real time asymmetrical data link, task 820 (FIG. 11) is executed.

When the service requested is not for a non-real time asymmetrical data link, task 806 is executed. In task 806, the communication hub determines that the requested custom service is not one of the services support by the communication hub. The subscriber terminal is notified and the subscriber terminal preferably displays a message indicating that the requested custom service is not supported by the system.

Figure 9:
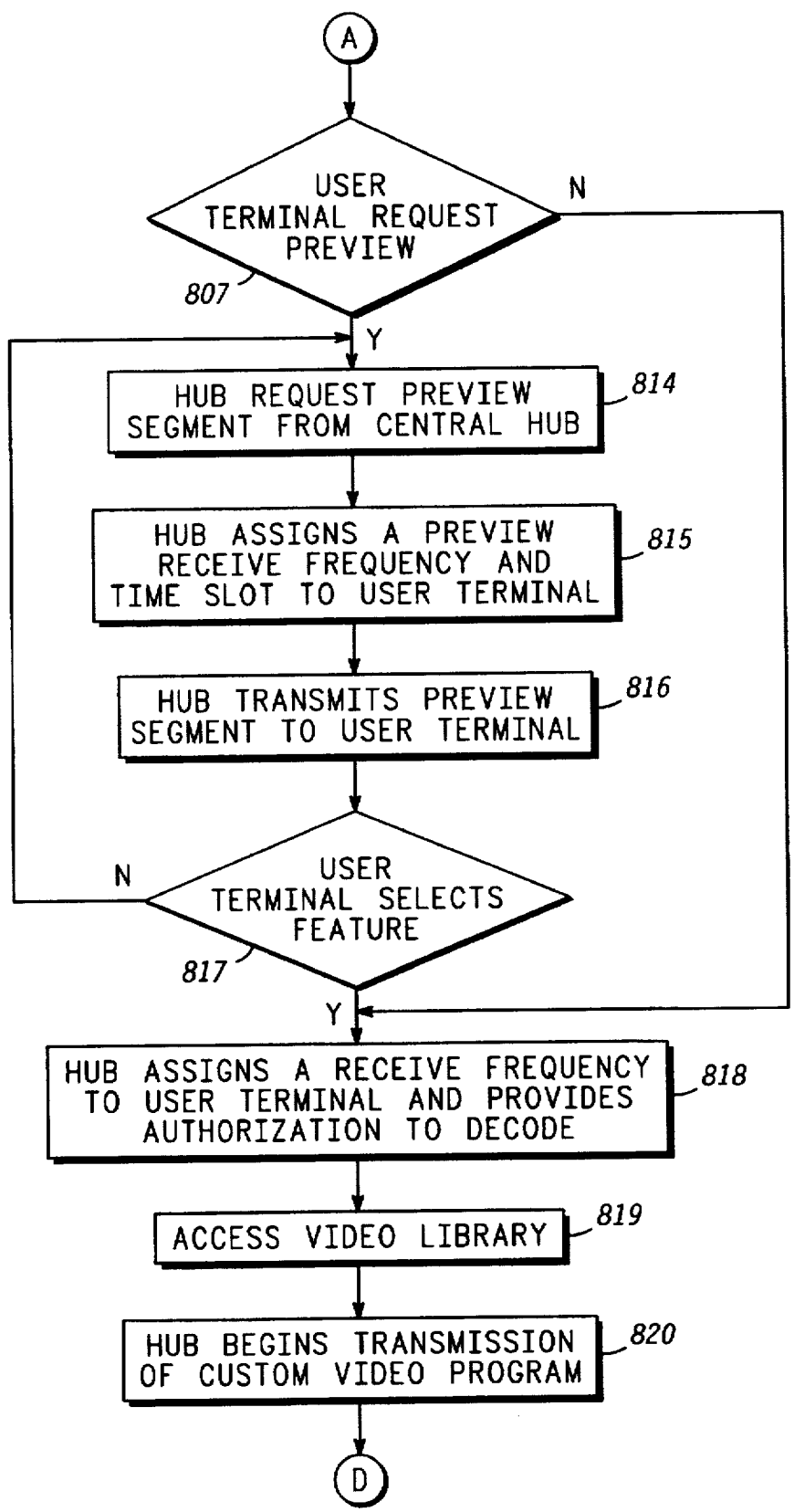
FIG. 9 illustrates a flow chart of a portion of a procedure performed by a communication hub when a request for a custom video transmission is received suitable for use in a preferred embodiment of the present invention.

FIG. 9 illustrates a flow chart of a portion of a procedure performed by a communication hub when a request for a custom video transmission is received suitable for use in a preferred embodiment of the present invention. When task 803 (FIG. 8) determines that a custom video transmission is requested, task 807 (FIG. 9) is executed. In task 807, the communication hub determines when a preview of a prospective video selection is requested. When a preview is requested, task 814 is executed. The communication hub requests a preview video segment from a video library that it has access to. In one embodiment of the present invention, hub 20 (FIG. 7) may request a preview video segment from central hub 720 (FIG. 7). Hub 20 preferably negotiates all link parameters with central hub 720 which are used to transport the preview sequence. When the subscriber terminal does not request a preview, task 818 is executed.

In task 815, the communication hub assigns a video carrier frequency to the subscriber terminal on which to receive the video preview sequence. A common carrier frequency may be allocated to each reuse frequency band to support the transmission of preview sequences to individual subscriber terminals. For example, one or more of video carrier frequencies 45 (FIG. 3) may be dedicated for preview video. This preview video carrier is preferably time shared to support multiple preview sequences for separate subscriber terminals. In this embodiment, the requesting subscriber terminal is notified of the specific time-slot of video carrier frequency 45 (FIG. 3) of video broadcast band 42 (FIG. 3) the requested preview will be transmitted.

In task 816, the hub transmits the preview sequence to the subscriber terminal on the video preview frequency carrier during the assigned time-slot. In task 817, the communication hub receives the subscriber terminal selection approval to transmit the full length video-on-demand or near-video-on-demand video program that was previewed. When the hub receives a rejections it may offer to preview other alliterative video-on-demand or near-video-on-demand offerings.

In task 818, the communication hub assigns the subscriber terminal a video carrier frequency on which to receive to custom video feature and authorizes the subscriber terminal to decode the video feature. In task 819, the hub accesses a video library for the requested video. The hub may receive video programming channels from the central hub over wireless links 730 or over exiting wireline wideband communications links where such infrastructure exists.

In task 820, the communication hub commences transmission of the requested video on assigned video carrier frequency. Upon completion of transmission of the custom video feature, task 830 is performed. The communication hub notifies the subscriber terminal that it no longer is authorized to decode the assigned carrier frequency. The carrier frequency and associated time-slot now becomes available for assignment to other subscriber terminals.

Figure 10:
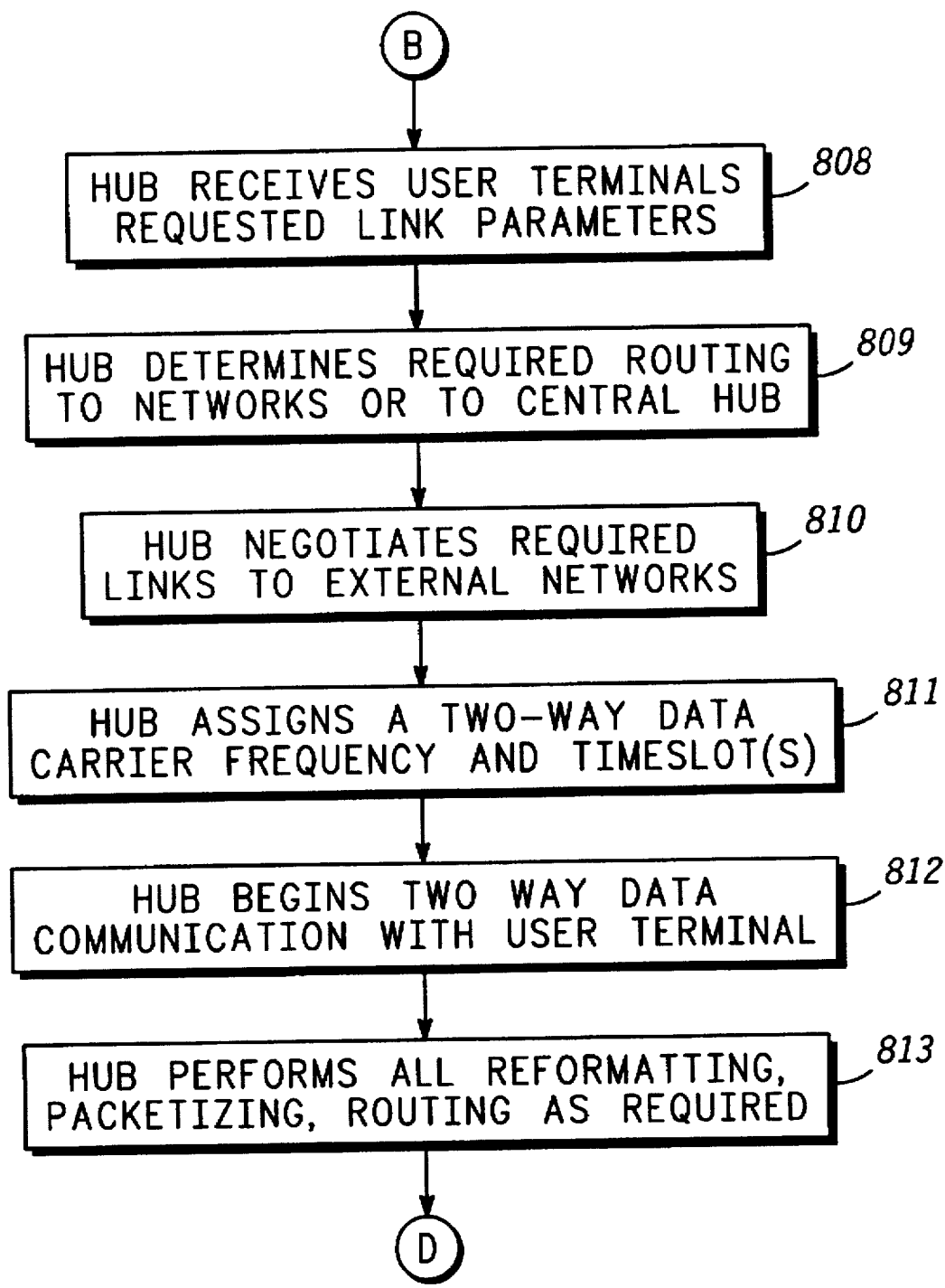
FIG. 10 illustrates a flow chart of a portion of a procedure performed by a communication hub when a request for a real-time two-way data link is received suitable for use in a preferred embodiment of the present invention.

FIG. 10 illustrates a flow chart of a portion of a procedure performed by a communication hub when a request for a real-time two-way data link is received suitable for use in a preferred embodiment of the present invention. When task 804 (FIG. 8) has determined that the requested service is for a real-time data link, task 808 is executed. In task 808, the communication hub receives requested link parameters from the user terminal for the real time two-way data link. In a preferred embodiment, the link parameters are received along with the request for service in task 802. In alternative embodiments, of the present invention, separate transmissions that include the link parameters may be sent from the user terminals. Although a real time two-way data link is desirably flexible enough to support a wide range of service, the hub should have some information detailing the quality of the link desirably. The requested link parameters may include link quality parameters such as latency of the data flow, continuity of the data flow, bit error rate of the link, approximate data rate required and burst characteristics of the data flow. These link parameters are used by the hub in allocating its resources and in negotiating links characteristic with other networks. For example, the hub may request the connection resource required from other networks such as SONET or ISDN and negotiate the resources allocated to it by other networks to assure satisfactory service to subscribers.

In another embodiment of the present invention, some or all of the various link parameters may not be provided by the subscriber terminal requesting the real time two-way data link. In this embodiment, the hub determines any link parameters not supplied by the subscriber terminal. For example, when standard telephony service is requested, the amount of bandwidth desired is minimal.

In task 809, the communication hub defines the routing necessary to establish the requested data link. The hub determines when the requested data link is with another subscriber terminal within the hub's service region. The hub also determines when a data link needs to be established with local area network or wide area network which the hub may have access. The hub also may determine when a data link needs to be established to a central hub. Preferably, the hub provides all basic routing information. The hub preferably provides all of the basic routing information to the system, and resources with in the overall network.

In task 810, the communication hub performs all negotiation for link characteristics and resources with external networks and with the central hub. The hub assures that the link with external networks is transparent to the subscriber terminal and preferably performs all overhead functions. The process is transparent to the subscriber who is completely unaware of any routing or packet restructuring that may be performed by the hub. Thus the hub preferably negotiates the resources so that the subscriber does not have to. For example, the hub provides any revisions required in protocol, timing, packet size and any additional processes required to assure the transmission of data occurs smoothly.

In task 811, the communication hub assigns a real time two-way data link to the subscriber terminal by allocating a time-slot of one of data carrier frequencies 35 (FIG. 3). The bandwidth is preferably determined by the type of service requested. For example standard telephone service requires a small amount of bandwidth while a real-time video and audio link requires more bandwidth. Multiple time-slots may be allocated to support higher link data rates. The link data rate may be incrementally increased by allocating additional time-slots to the link on the same carrier frequency. The number of receive and transmit time-slot allocated is increased to improve the data rate that can be supported by the to the subscriber. In one embodiment, as the subscriber requires a higher data rate for increased data transmission, the number when time-slots allocated to a particular user is increased. Thus time-slots are preferably dynamically allocated to accommodated a range to data communication rates.

in task 812, the communication hub begins two-way data transmission with the subscriber terminal. During the performance of task 812, the communication hub performs all of the overhead functions to maintain the data link with other networks in task 813. The hub may also performs any reformatting required for the data flow from the subscriber terminal to be compatible with different external network protocols including providing the correct packetization of the data.

After a period of time, the hub may receive notification from the subscriber terminal it wished to terminate the service. In another embodiment, the hub may request the subscriber terminal when additional link time is desired after a predetermined period of time. When the subscriber terminal wishes to terminate the data link, task 827 is performed. The hub releases the assigned data link time-slot of the data carrier frequency, making it available for other subscribers and other services.

Figure 11:
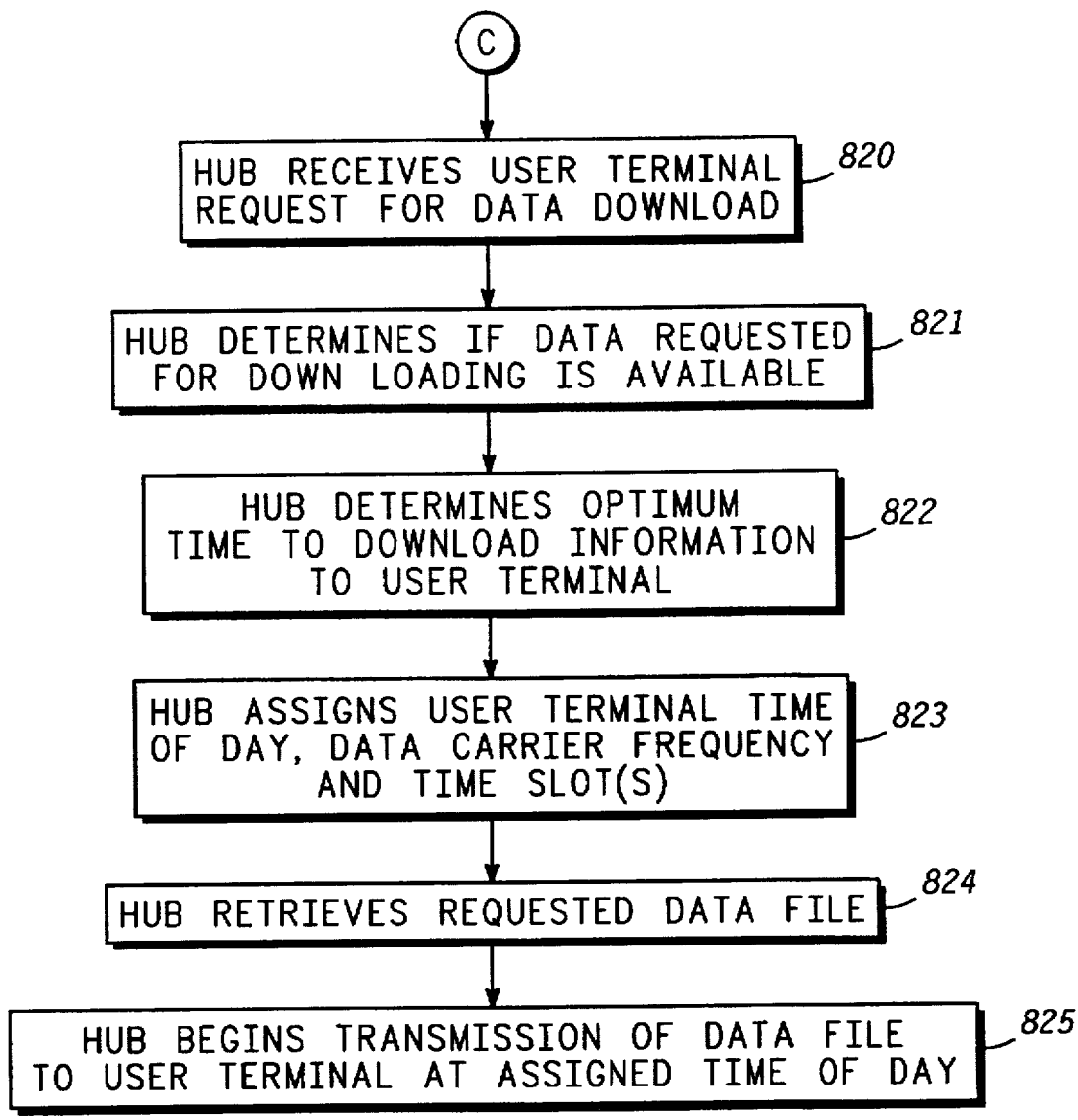
FIG. 11 illustrates a flow chart of a portion of a procedure performed by a communication hub when a request for a non-real-time data download is received suitable for use in a preferred embodiment of the present invention.

FIG. 11 illustrates a flow chart of a portion of a procedure performed by a communication hub when a request for a non-real-time data download is received suitable for use in a preferred embodiment of the present invention. When task 805 (FIG. 8) has determined that the requested service requires a non-real time asymmetrical data link, task 820 is executed. In task 820, the communication hub receives a subscriber terminal request for asymmetrical data down load. This request preferably includes an application (i.e., a computer program that created the requested data), a data file name and file type. An example of an application is a service or computer program that can perform various service or function. Non-real time services include the down loading of revised menu selections or operating software, newspaper and magazine information retrieval services, etc.). One difference between task 820 and 805 is that task 805 preferably determines when non-real time data is acceptable. When non-real time data is acceptable the network should deal with information request that are time critical first and deal with information that is not time critical can be downloaded when network resource are readily available.

In task 821, the communication hub determines when the requested data file is available. The hub preferably maintains information on the location of data files that can be down loaded within the functionality of a non-real time asymmetrical two-way data link. The hub locates the address of the appropriate data file from a data storage or data archives located at the central hub or from other network resource.

In task 822, the communication hub manages the selection of the time and day for the downloading of the requested information to take place. The selection of the time is desirably based upon a demand history for the hub's service region. The demand history is preferably maintained by the hub. The time and day may be selected to minimize potential conflict for network resources with other service demands that may have time sensitivity. In one embodiment, the subscriber terminal specifies the time and day for downloading the requested information. In this embodiment, the subscriber terminal is charged different service charges depend on the time and day that is requested. Higher rates may be for peak hours, and lower rates may be charged for off-peak hours. This information is provided to the user terminal.

In task 823, the communication hub assigns the time of day to the subscriber terminal for the data downloading to take place. In one embodiment, the hub may assign times of other days during the week, month or year to download the data to the user terminal. In this embodiment, the subscriber terminal may indicate preferences when requesting the data. As part of task 823, the hub also assigns a data carrier frequency and a time-slot. To maximize use of the communication resources, the hub may assign all time-slots of a particular data carrier frequency. In this way, bandwidth is maximized and the data transmission requires less time to download. The time-slot and frequency allocation is transited to the subscriber from the hub preferably over a broadcast channel allocated within the data communication band. The hub logs the scheduled time for the transmission into a queue and manages its network resources to accommodate this scheduled data transmission.

In task 824, the communication hub retrieves the data file to be down loaded to the subscriber terminal. The hub may obtains the data file from an internal data storage, or retrieve the data file from a central hub or an external network resource. The hub maintains the data file until it has been completely downloaded to the appropriate subscriber terminal. Task 824 may be performed at any time after task 823 and before the assigned time of day.

At the time scheduled in task 823, the communication hub transmits the data file to the subscriber terminal on the assigned data carrier and time-slot in task 825. The hub monitors an access request channel of the data communication band to confirm that the data was accurately received by the subscriber, or for acknowledgment of complete transmission of the data file from the subscriber terminal.

Referring back to procedure 800 (FIG. 8.), task 827 is performed after the data has been downloaded to the subscriber terminal. The carrier frequency and time-slots are made available for subsequent use. Task 830 is the end of procedure 800.

Thus, a wireless digital data access network and method has been described which overcomes specific problems and accomplishes certain advantages relative to prior art methods and mechanisms. The improvements over known technology are significant. The expense, complexities, and difficulties with installing optical or coaxial data links are avoided. Improved use of the 28.5 to 30.5 GHz frequency band is achieved through segmentation. Other advantages of the present invention include a communication system that provides high data rates between locations without coax or fiber optical cables. Another advantage of the present invention is that it provides an alternative link to broadband information systems. Another advantage of the present invention is that it provides access to broadband information systems that is low cost. Another advantage of the present invention is that it supports high speed data transfer. Another advantage of the present invention is that it provides real-time two-way broadband communication. Another advantage of the present invention is that it allows for on demand video without wireline or optical links.

The foregoing description of the specific embodiments will so fully reveal the general nature of the invention that others can, by applying current knowledge, readily modify and/or adapt for various applications such specific embodiments without departing from the generic concept, and therefore such adaptations and modifications should and are intended to be comprehended within the meaning and range of equivalents of the disclosed embodiments.

It is to be understood that the phraseology or terminology employed herein is for the purpose of description and not of limitation. Accordingly, the invention is intended to embrace all such alternatives, modifications, equivalents and variations as fall within the spirit and broad scope of the appended claims.

What is claimed is:

1. A method for communicating over a segmented frequency band having first and second adjacent segments, said first segment for continuous video transmission and said second segment for two-way communication, said method comprising the steps of:

(a) transmitting, to a subscriber station, continuous video data in said first segment;

(b) receiving first data from said subscriber station in said second segment;

(c) assigning a frequency channel of said second segment to said subscriber unit in response to said first data; and (d) transmitting second data to said subscriber station over said frequency channel of said second segment in response to said first data, wherein step (a) is performed during the performance of steps (b) (c), and (d).

2. A method as claimed in claim 1 wherein the receiving step includes the step of receiving said first data from said subscriber station where said first data includes a request for either a custom video transmission, establishment of a real-time two-way data link, or a non-real-time asymmetrical data download.

3. A method for communicating over a segmented frequency band having first and second adjacent segments, said first segment for continuous video transmission and said second segment for two-way communication, said method comprising the steps of:

(a) transmitting, to a subscriber station, continuous video data in said first segment;

(b) receiving first data from said subscriber station in said second segment; and (c) transmitting second data to said subscriber station in said second segment in response to said first data, wherein step (a) is performed during the performance of steps (b) and (c), wherein the receiving step includes the step of receiving said first data from said subscriber station wherein said first data includes a request for either a custom video transmission, establishment of a real-time two-way data link, or a non-real-time asymmetrical data download, wherein said first segment is comprised of first, and second video subbands said second segment is comprised of first and second data subbands, and wherein the method further comprises the steps of:

(a1) transmitting, by a first communication hub to a first subscriber station, said continuous video data in said first video subband, said first subscriber station located in a first geographic region being served by said first communication hub;

13

(a2) transmitting, by a second communication hub to a second subscriber station, said continuous video data in said second video subband, said second subscriber station located within a second geographic region being served by said second communication hub;

(b1) receiving said first data from said first subscriber station in said first data subband;

(b2) receiving third data from said second subscriber station in said second data subband;

(c1) transmitting, by said first communication hub to said first subscriber station, said second data in said first data subband in response to said first data; and (c2) transmitting, by said second communication hub to said second subscriber station, fourth data in said second data subband in response to said third data, wherein said first and third data include a request for either a custom video transmission, establishment of a real-time two-way data link, or a non-real-time asymmetrical data download.

4. A method as claimed in claim 3 wherein said first data subband comprises time division and frequency division multiplexed frequency channels that are non-interfering with time division and frequency division multiplexed frequency channels of said second data subband.

5. A method as claimed in claim 4 wherein said first segment includes a third video subband and said second segment includes a third data subband, and the method further comprises the steps of:

(a3) transmitting, by a third communication hub to a third subscriber station located in a third geographic region, said continuous video data in said third video subband;

(b3) receiving fifth data from said third subscriber station in said third data subband, said fifth data including a request for either a custom video transmission, establishment of a real-time two-way data link, or a non-real-time asymmetrical data download; and (c3) transmitting by said third communication hub to said third subscriber station, sixth data in said third data subband in response to said fifth data.

6. A method for communicating over a segmented frequency band having first and second adjacent segments, said first segment for continuous video transmission and said second segment for two-way communication, said method comprising the steps of:

(a) transmitting, to a subscriber station, continuous video data in said first segment;

(b) receiving first data from said subscriber station in said second segment; and (c) transmitting second data to said subscriber station in said second segment in response to said first data, wherein step (a) is performed during the performance of steps (b) and (c), wherein the receiving step includes the step of receiving said first data from said subscriber station where said first data includes a request for either a custom video transmission, establishment of a real-time two-way data link, or a non-real-time asymmetrical data download, and wherein the method further comprises the steps of:

assigning, when said request is for said custom video transmission, a frequency channel of said first segment that includes receive time-slots;

assigning, when said request is for establishment of said real-time two-way data link, a frequency channel of said second segment that includes receive and transmit time-slots; and

14 assigning, when said request is for said non-real-time asymmetrical data download, a frequency channel of said second segment that includes receive time-slots.

7. A method as claimed in claim 6 further comprising the step of providing said subscriber station an authorization to decode said custom video transmission when said request is for said custom video transmission.

8. A method for communicating over a segmented frequency band having first and second adjacent segments, said first segment for continuous video transmission and said second segment for two-way communication, said method comprising the steps of:

(a) transmitting, to a subscriber station, continuous video data in said first segment;

(b) receiving first data from said subscriber station in said second segment; and (c) transmitting second data to said subscriber station in said second segment in response to said first data, wherein step (a) is performed during the performance of steps (b) and (c), wherein said second segment is time division multiplexed and includes receive and transmit time-slots, and wherein:

the receiving step includes the step of receiving, from said subscriber station, channel assignment requests in said second segment, the method further comprises the step of assigning said subscriber station at least one of said receive time-slots of said second segment in response to said first data, and step (c) includes the step of transmitting said second data to said subscriber station wherein said subscriber station receives said second data during said receive time-slots.

9. A method as claimed in claim 8 wherein the assigning step further comprises the step of assigning said subscriber station at least one of said transmit time-slots of said second segment, and wherein step (b) includes the step of receiving said first data from said subscriber station during said transmit time-slots.

10. A method as claimed in claim 9 wherein said segmented frequency band has a frequency range between 25 and 35 GHz and a bandwidth between 0.5 and 2.0 GHz, said bandwidth comprising said first and second segments, and wherein step (a) includes the step of transmitting continuous video data in said first segment, and wherein steps (a) and (c) include the step of transmitting to a single antenna of said subscriber station, said single antenna receiving said continuous video data and said second data simultaneously.

11. A method for communicating over a segmented frequency band having a first segment and a second segment, said first segment for continuous video transmission and said second segment for two-way communication, said method comprising the steps of:

transmitting, continuous video data in said first segment;

receiving a request for either a custom video transmission, establishment of a real-time two-way data link, or a non-real-time asymmetrical data download from a subscriber station in said second segment;

assigning, when said request is for said custom video transmission, a frequency channel of said first segment that includes only receive time-slots;

assigning, when said request is for establishment of said real-time two-way data link, a frequency channel of said second segment that includes both receive and transmit time-slots; and assigning, when said request is for said non-real-time asymmetrical data download, a frequency channel of said second segment that includes only receive time-slots.

12. A communication system that provides continuous video transmission and two-way data communication between a subscriber station and a communication hub within a frequency band, said frequency band having at least a first segment for said continuous video transmission, and a second adjacent segment for said two-way data or voice communication, said system comprising:

a receiver for receiving first data from said subscriber station in said second segment; and a transmitter for transmitting continuous video data in said first segment, assigning a frequency channel of said second segment in response to said first data, and transmitting second data to said subscriber station on said frequency channel of said second segment in response to said first data.

13. A communication system as claimed in claim 12 further comprising means for receiving said first data from said subscriber station wherein said first data includes a request for either a custom video transmission, establishment of a real-time two-way data link, or a non-real-time asymmetrical data download.

14. A communication system that provides continuous video transmission and two-way data communication between a subscriber station and a communication hub within a frequency band, said frequency band having a first segment for said continuous video transmission, and a second adjacent segment for said two-way data communication, said system comprising:

a receiver for receiving first data from said subscriber station in said second segment, a transmitter for transmitting continuous video data in said first segment, and transmitting second data to said subscriber station in said second segment in response to said first data; and means for receiving said first data from said subscriber station wherein said first data includes a request for either a custom video transmission, establishment of a real-time two-way data link, or a non-real-time asymmetrical data download, wherein said first segment is comprised of first, and second video subbands said second segment is comprised of first and second data subbands, and wherein the communication system further comprises:

means for transmitting, by a first communication hub to a first subscriber station, said continuous video data in said first video subband, said first subscriber station located in a first geographic region being served by said first communication hub;

means for transmitting, by a second communication hub to a second subscriber station, said continuous video data in said second video subband, said second subscriber station located within a second geographic region being served by said second communication hub;

means for receiving said first data from said first subscriber station in said first data subband;

means for receiving third data from said second subscriber station in said second data subband;

means for transmitting, by said first communication hub to said first subscriber station, said second data in said first data subband in response to said first data; and means for transmitting, by said second communication hub to said second subscriber station, fourth data in said second data subband in response to said third data, wherein said first and third data include a request for either a custom video transmission, establishment of a real-time two-way data link, or a non-real-time asymmetrical data download.

15. A communication system as claimed in claim 14 wherein said first data subband comprises time division and frequency division multiplexed frequency channels that are non-interfering with time division and frequency division multiplexed frequency channels of said second data subband.

16. A communication system as claimed in claim 15 wherein said first segment includes a third video subband and said second segment includes a third data subband, and the communication system further comprises:

means for transmitting, by a third communication hub to a third subscriber station located in a third geographic region, said continuous video data in said third video subband;

means for receiving fifth data from said third subscriber station in said third data subband, said fifth data including a request for either a custom video transmission, establishment of a real-time two-way data link, or a non-real-time asymmetrical data download; and means for transmitting by said third communication hub to said third subscriber station, sixth data in said third data subband in response to said fifth data.

17. A communication system that provides continuous video transmission and two-way data communication between a subscriber station and a communication hub within a frequency band, said frequency band having a first segment for said continuous video transmission, and a second adjacent segment for said two-way data communication, said system comprising:

a receiver for receiving first data from said subscriber station in said second segment, and a transmitter for transmitting continuous video data in said first segment, and transmitting second data to said subscriber station in said second segment in response to said first data, wherein the receiver includes means for receiving said first data from said subscriber station where said first data includes a request for either a custom video transmission, establishment of a real-time two-way data link, or a non-real-time asymmetrical data download, and wherein the communication system further comprises:

means for assigning, when said request is for said custom video transmission, a frequency channel of said first segment that includes receive time-slots;

means for assigning, when said request is for establishment of said real-time two-way data link, a frequency channel of said second segment that includes receive and transmit time-slots; and means for assigning, when said request is for said non-real-time asymmetrical data download, a frequency channel of said second segment that includes receive time-slots.

18. A communication system that provides continuous video transmission and two-way data communication between a subscriber station and a communication hub within a frequency band, said frequency band having a first segment for said continuous video transmission, and a second adjacent segment for said two-way data communication, said system comprising:
- a receiver for receiving first data from said subscriber station in said second segment, and
- a transmitter for transmitting continuous video data in said first segment, and transmitting second data to said subscriber station in said second segment in response to said first data, wherein said second segment is time division multiplexed and includes receive and transmit time-slots, and wherein:
- the receiver includes means for receiving, from said subscriber station, channel assignment requests in said second segment, and
- the communication system further comprises means for assigning said subscriber station at least one of said receive time-slots of said second segment in response to said first data, and means for transmitting said second data to said subscriber station wherein said subscriber station receives said second data during said receive time-slots.

19. A communication system as claimed in claim 18 further comprising means for assigning said subscriber station at least one of said transmit time-slots of said second segment, and means for receiving said first data from said subscriber station during said transmit time-slots.

20. A communication system as claimed in claim 19 wherein said frequency band has a frequency range between 25 and 35 GHz and a bandwidth between 0.5 and 2.0 GHz, said bandwidth comprising said first and second segments, and includes means for transmitting to a single antenna of said subscriber station, said single antenna receiving said continuous video data and said second data simultaneously.

* * * * *